United States Patent [19]

Banno

[11] Patent Number: 5,659,783
[45] Date of Patent: Aug. 19, 1997

[54] OPERATION UNIT WITH PLURAL OPERATION CIRCUITS HAVING PLURAL DATA BUSES PROVIDING PLURAL OPERATION MODES

[75] Inventor: Moriyasu Banno, Yokohama, Japan

[73] Assignee: Kabushiki Kaisha Toshiba, Kawasaki, Japan

[21] Appl. No.: 364,729

[22] Filed: Dec. 27, 1994

[30] Foreign Application Priority Data

Dec. 27, 1993  [JP]  Japan .................................. 5-329505

[51] Int. Cl.⁶ .............................. G06F 13/40; G06F 13/42
[52] U.S. Cl. .................. 395/800.43; 395/287; 395/296; 395/308; 395/309; 364/DIG. 1; 364/DIG. 2
[58] Field of Search ........................ 395/800, 436, 395/495, 497.04, 164, 200.14, 285, 309, 287, 475, 891, 308, 162, 296, 375, 185.05, 775; 364/DIG. 1, DIG. 2, 736.5, 757, 749

[56] References Cited

U.S. PATENT DOCUMENTS

| | | | |
|---|---|---|---|
| 4,528,641 | 7/1985 | Burrows | 364/757 |
| 4,789,957 | 12/1988 | Niehaus et al. | 364/749 |
| 4,811,266 | 3/1989 | Woods et al. | 364/736.5 |
| 5,301,340 | 4/1994 | Cook | 395/800 |

FOREIGN PATENT DOCUMENTS

WO82/03481  10/1982  WIPO.

OTHER PUBLICATIONS

Patent Abstracts of Japan, vol. 11, No. 107 (P-563)(2554), Apr. 4, 1987, JP-A-61 255433, Nov. 13, 1986.
Hewlett-Packard Journal, vol. 33, No. 3, 1982, Frederic C. Amerson, et al., "High-Performance Computing With Dual ALU Architecture and ECL Logic", pp. 3-11.

Primary Examiner—Daniel H. Pan
Attorney, Agent, or Firm—Oblon, Spivak, McClelland, Maier & Neustadt, P.C.

[57] ABSTRACT

An operation unit has operation circuits (aL, aH), temporary registers (xL, yL, xH, yH) arranged just before the operation circuits, registers (R1, R2, R3, R4) arranged if required, and data buses (d1L, d2L, d1H, d2H) for transferring data among the operation circuits, temporary registers, and registers. Data to be processed are divided, are transferred to the operation circuits through the data buses, and are simultaneously and independently processed by the operation circuits. When a result of the preceding operation affects the following operation, data except the result of the preceding operation are transferred from the registers to the temporary registers before starting the operations. These techniques shorten a processing time.

18 Claims, 8 Drawing Sheets

| | 1ST STATE | 2ND STATE |
|---|---|---|
| REGISTER R1 | r1 | r1+r3+CARRY |
| REGISTER R2 | r2 | r2+r4 |
| REGISTER R3 | r3 | |
| REGISTER R4 | r4 | |
| DATA BUS d1H | r1 | r1+r3+CARRY |
| DATA BUS d1L | r2 | r2+r4 |
| DATA BUS d2H | r3 | |
| DATA BUS d2L | r4 | |
| TEMPORARY REGISTER x | r12 | |
| TEMPORARY REGISTER y | r34 | |
| OPERATION CONTROL SIGNAL f | ADD INSTRUCTION | |
| CARRY INPUT Cin | "0" | |
| OUTPUT OF OPERATION CIRCUIT | r12+r34 | |

OPERATION UNIT WITH PLURAL OPERATION CIRCUITS HAVING PLURAL DATA BUSES PROVIDING PLURAL OPERATION MODES

BACKGROUND OF THE INVENTION

1. Field of the Invention

The present invention relates to a high-speed operation unit, and particularly, to an operation unit applicable to a high-speed microprocessor.

2. Description of the Prior Art

Figure 1:
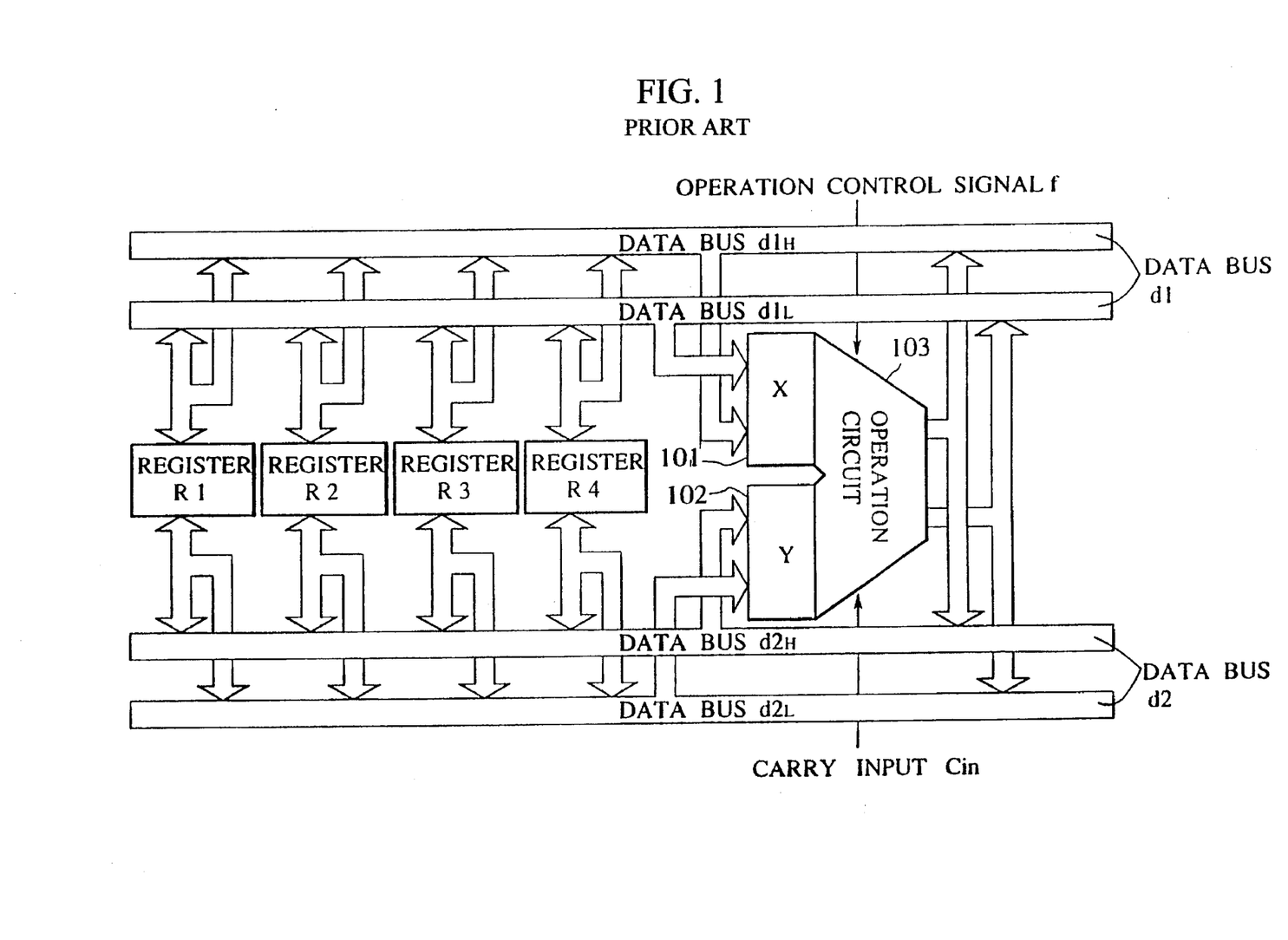
FIG. 1 shows an operation unit according to a prior art.

FIG. 1 shows a conventional operation unit that processes 16-bit data at the maximum. The operation unit has a 16-bit operation circuit 103 and temporary registers x101 and y102 directly connected to the data input of the operation circuit 103, to temporarily hold data to be processed. The temporary registers x101 and y102 are connected to 16-bit data buses d1 and d2. The output of the operation circuit 103 is connected to any one of the data buses d1 and d2. For the sake of explanation, the operation unit shown in FIG. 1 has 8-bit registers R1, R2, R3, and R4. The registers R1 and R2 are paired to form a 16-bit register R12, and the registers R3 and R4 are paired to form a 16-bit register R34. The data bus d1 is divided into a lower 8-bit bus d1L and a higher 8-bit bus d1H, and the data bus d2 is divided into a lower 8-bit bus d2L and a higher 8-bit bus d2H. Each of the registers R1 to R4 is connected to all of the 8-bit buses d1L, d2L, d1H, and d2H. During an 8-bit operation, the registers R1 to R4 are connected to the lower 8-bit buses d1L and d2L, and "0" is given to the higher 8-bit buses d1H and d2H when reading the contents of the registers.

Figure 2:
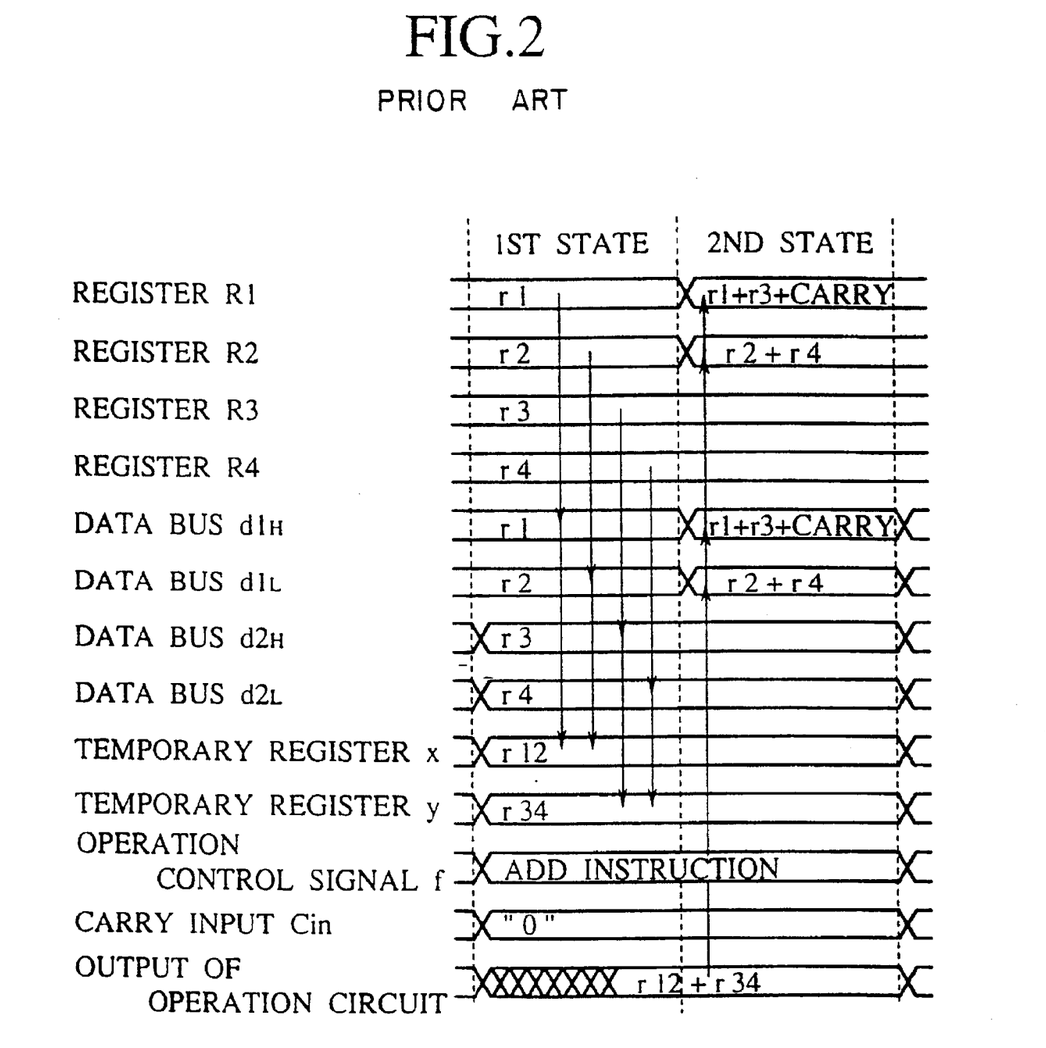
FIGS. 2 to 4 are timing charts showing the operations of the prior art.

A 16-bit operation processed by the operation unit shown in FIG. 1 will be explained with reference to a timing chart shown in FIG. 2. In FIG. 2, "r1" to "r4" are the contents of registers R1 to R4, respectively. And "r12" and "r34" indicate the contents of register pairs R12 and R34, respectively. For example, the contents of the register pair R12, in which the register R1 holds higher 8 bits and the register R2 holds lower 8 bits, are added to the contents of the register pair R34, in which the register R3 holds higher 8 bits and the register R4 holds lower 8 bits, and a result of the operation is written to the register pair R12. Namely, R12+R34→R12. In the first state, the contents of the register pair R12 are transferred to the data bus d1. Namely, the contents of the register R1 are transferred to the higher 8-bit bus d1H, and the contents of the register R2 are transferred to the lower 8-bit bus d1L. At the same time, the contents of the register pair R34 are transferred to the data bus d2. Namely, the contents of the register R3 are transferred to the higher 8-bit bus d2H, and the contents of the register R4 are transferred to the lower 8-bit bus d2L. Thereafter, the contents of the register pair R12 on the data bus d1 are written to the temporary register x101, and the contents of the register pair R34 on the data bus d2 are written to the temporary register y102. In response to an operation control signal f, an addition instruction is given to the operation circuit 103, and "0" is given to a carry input Cin. Then, the operation circuit 103 calculates x+y.

In the second state, the operation circuit 103 provides the data bus d1 with a result of the operation. Namely, the operation circuit 103 provides the higher 8-bit bus d1H with higher 8 bits of the result, and the lower 8-bit bus d1L with lower 8 bits of the result. The result on the data bus d1 is written to the register pair R12. In FIG. 2, "carry" indicates a carry caused by adding the contents of the registers R2 and R4.

Figure 3:
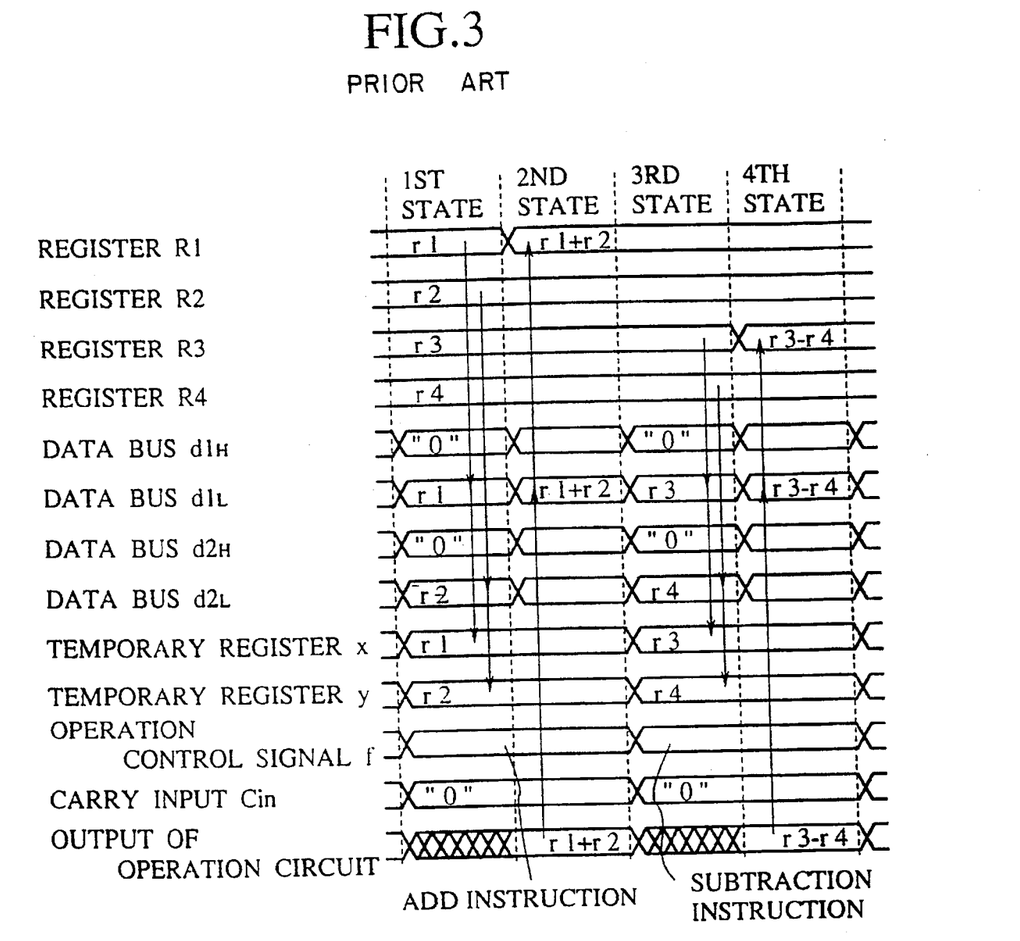

An 8-bit operation processed by the operation unit of FIG. 1 will be explained with reference to a timing chart of FIG. 3. For example, the contents of the register R1 are added to the contents of the register R2, and a result of the operation is written to the register R1. Further, the contents of the register R4 are subtracted from the contents of the register R3, and a result of the operation is written to the register R3. Although these operations are 8-bit operations, the operation unit shown in FIG. 1 processes them as 16-bit operations one by one. Namely, the operation of R1+R2→R1 is firstly processed, and then, the operation of R3−R4→R3 is processed. In the first state, the contents of the registers R1 and R2 are transferred to the data buses d1L and d2L, respectively. At this time, the data buses d1H and d2H receive "0." The data on the data buses are transferred to the temporary registers x101 and y102, respectively. In response to the operation control signal f, an addition instruction is given to the operation circuit 103, and "0" is given to the carry input Cin. Then, the operation circuit 103 calculates x+y. In the second state, the operation circuit 103 provides the data bus d1L with a result of the calculation, which is stored in the register R1. In the third state, the contents of the registers R3 and R4 are transferred to the data buses d1L and d2L, respectively, and "0" is given to the data buses d1H and d2H. The data on the data buses d1 and d2 are written to the temporary registers x101 and y102. In response to the operation control signal f, a subtraction instruction is given to the operation circuit 103, and "0" is given to the carry input Cin. Then, the operation circuit 103 calculates x−y. In the fourth state, the operation circuit 103 provides the data bus d1L with a result of the operation, which is written to the register R3. In this way, the conventional operation unit must handle 8-bit operations as 16-bit operations, to idle the higher 8 bits of the operation circuit 103. Since the conventional operation unit must execute 8-bit operations one by one, it needs four states in the case of the above example.

Figure 4:
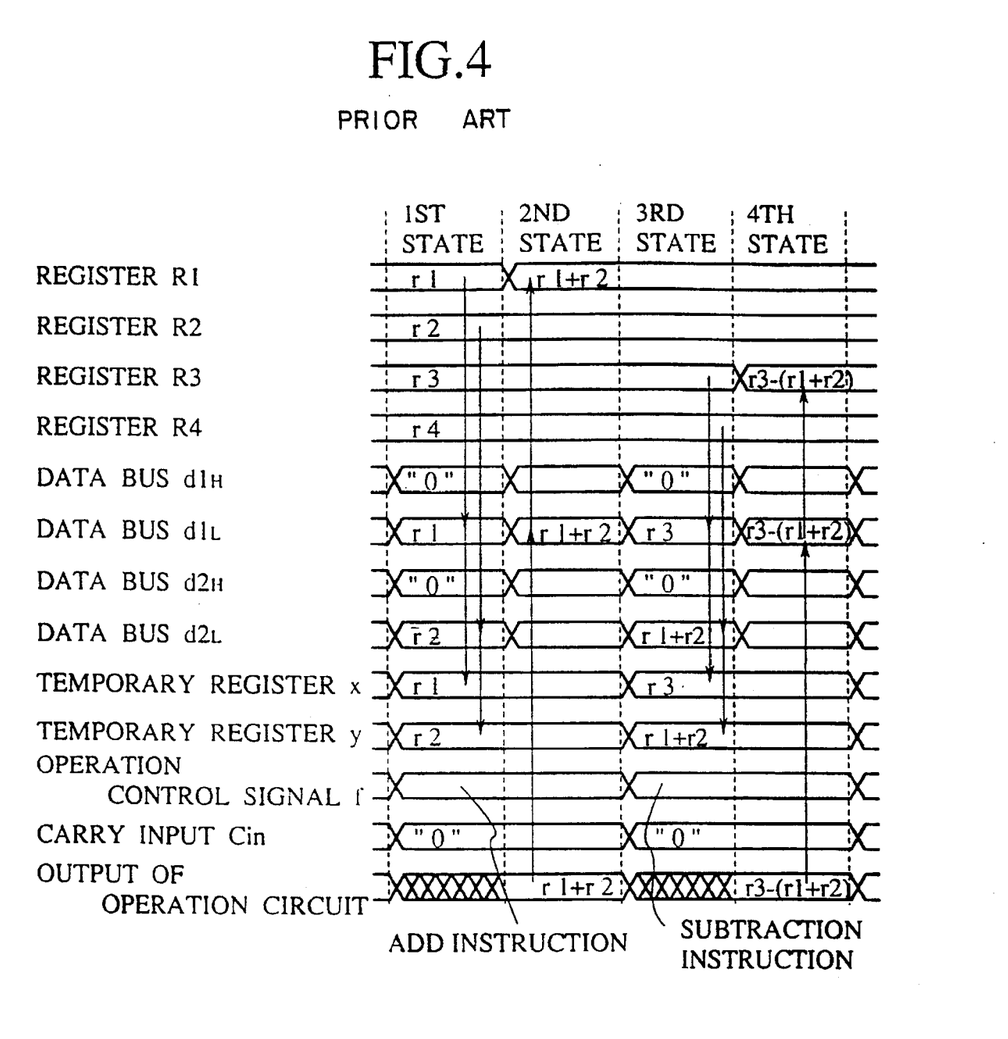

Another operation of the operation unit shown in FIG. 1 that uses a result of the preceding operation will be explained with reference to a timing chart shown in FIG. 4. For example, the contents of the register R1 are added to the contents of the register R2, and a result of the operation is written in the register R1. Thereafter, the new contents of the register R1 are subtracted from the contents of the register R3, and the difference is written to the register R3. The operation unit shown in FIG. 1 must process these operations as 16-bit operations, so that the contents of the register R3 will not be written to the temporary registers x101 or y102 before the first operation of R1+R2→R1 is completed. Accordingly, the process of R3−R1→R3 is carried out only after the completion of the process R1+R2→R1. In the first state, the contents of the registers R1 and R2 are transferred to the data buses d1L and d2L, respectively, and "0" is given to the data buses d1H and d2H. The data on the data buses d1 and d2 are written to the temporary registers x101 and y102, respectively. In response to the operation control signal f, an addition instruction is given to the operation circuit 103, and "0" is given to the carry input Cin. Then, the operation circuit 103 calculates x+y. In the second state, the operation circuit 103 provides the data bus d1L with a result of the operation, i.e., the sum of the contents of the registers R1 and R2, which is written to the register R1. In the third state, the contents of the registers R3 and R1 are transferred to the data buses d1L and d2L, respectively, and "0" is given to the data buses d1H and d2H. The data on the data buses d1 and d2 are written to the temporary registers x101 and y102, respectively. In response to the operation control signal f, a subtraction instruction is given to the operation circuit 103, and "0" is given to the carry input Cin. Then, the operation circuit 103 calculates x–y. In the fourth state, the operation circuit 103 provides the data bus d1L with a result of the operation, i.e., a difference between the contents of the registers R3 and R1, which is written to the register R3.

In this way, the conventional operation unit processes 8-bit operations one by one although it is a 16-bit operation unit, and requires four states in the case of the above example. Namely, it processes an 8-bit binary operation only after the completion of the preceding 8-bit binary operation. Since the conventional operation unit is incapable of simultaneously processing a plurality of operations, it involves a lone processing time.

SUMMARY OF THE INVENTION

An object of the present invention is to provide an operation unit that is capable of simultaneously processing a plurality of operations, to shorten a processing time.

Figure 5:
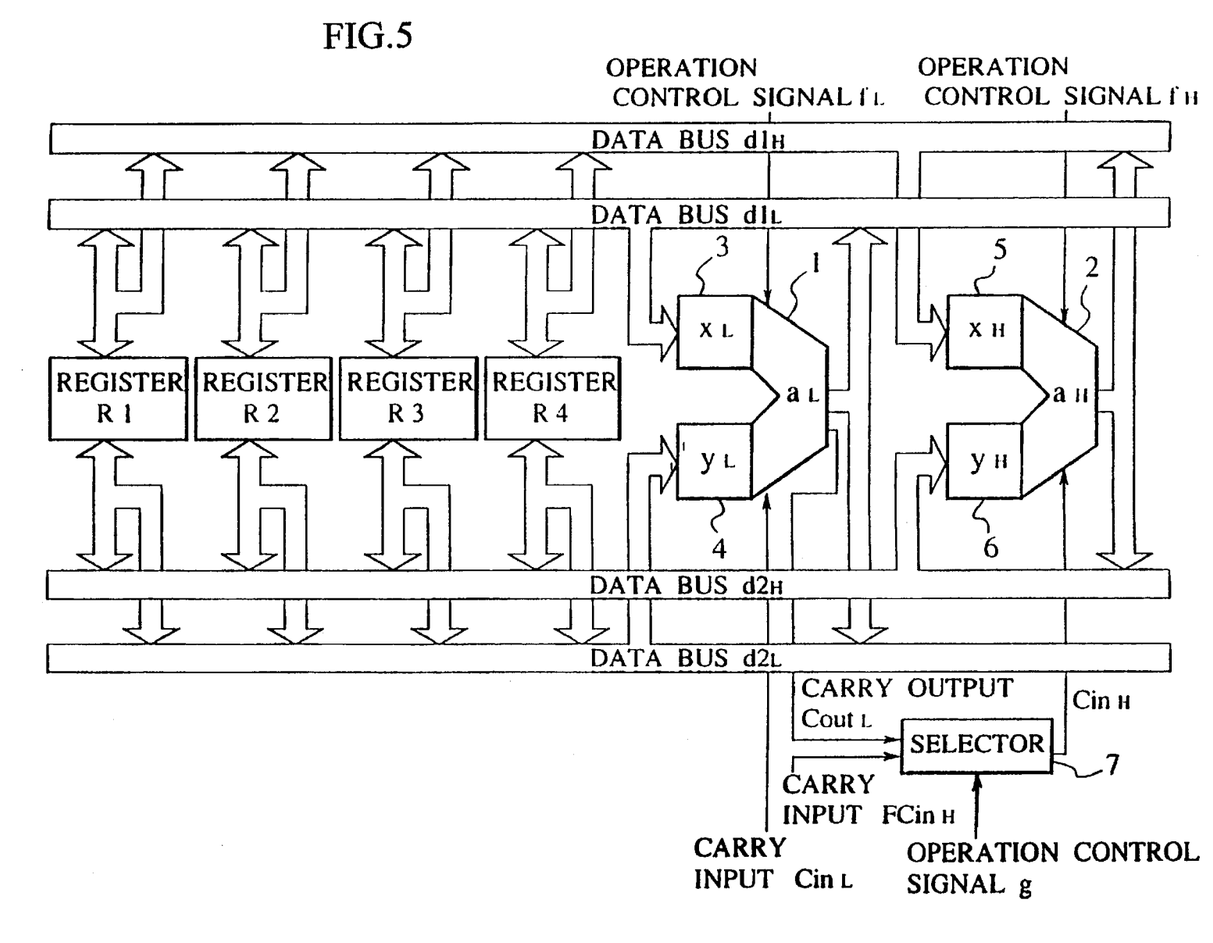
FIG. 5 shows an operation unit according to an embodiment of the present invention.

In order to accomplish the object, the present invention provides an operation unit shown in FIG. 5. This operation unit handles data of "m" bits at the maximum and "n" bits at the minimum. The operation unit has n-bit operation circuits (1, 2, or more generally, 1, 2, 3, . . . k), first hold means such as temporary registers (3, 4, 5, 6, . . . ), transfer units (7), second hold means such as registers (R1, R2, R3, R4, . . . ), and data buses (d1L, d1H, d2L, d2H, or more generally, $d1_1, d1_2, d1_3, \ldots d1_k, d2_1, d2_2, d2_3, \ldots, d2_k$). The operation circuits are independent of one another. The first hold means are arranged just before the respective operation circuits, to temporarily hold n-bit data to be given to the respective operation circuits. Each of the transfer units transfers a carry from the preceding operation circuit to the following operation circuit. The second hold means hold data. The data buses are paths for transmitting data among the operation circuits, the first and second hold means.

When processing data of "n" bits or greater, the second hold means provide the operation circuits with n-bit data, and the operation circuits simultaneously process the data. When required, a lower one of the operation circuits provides the following processor with a carry. In this way, the operation circuits are independently and simultaneously operated to process data of "m" bits or smaller. Alternatively, the operation circuits are sequentially operated such that a result of operation of one operation circuit is given to the next operation circuit. If a given operation requires a result of the preceding operation, data except the result of the preceding operation are transferred to the first hold means in advance.

Other and further objects and features of this invention will become obvious upon an understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE EMBODIMENTS

Various embodiments of the invention will be described with reference to the accompanying drawings. It is to be noted that the same or similar reference numerals are applied to the same or similar parts and elements throughout the drawings, and the description of the same or similar parts and elements will be omitted or simplified.

FIG. 5 shows an operation unit according to an embodiment of the present invention. The operation unit has 8bit operation circuits aL1 and aH2. Temporary registers xL3 and yL4 are directly connected to the data input of the operation circuit aL1, and temporary registers xH5 and yH6 are directly connected to the data input of the operation circuit aH2, to temporarily hold data to be processed. A selector 7 transfers a carry from the operation circuit aL1 to the operation circuit aH2. Data buses d1L, d2L, d1H, and d2H are paths for transferring data among the operation circuits aL1 and aH2 and temporary registers xL3, yL4, xH5, yH6. For the sake of explanation, the operation unit shown in FIG. 5 has 8-bit registers R1, R2, R3, and R4 for holding operation data and operation result data. The registers R1 to R4 may be other storage elements. The operation circuits aL1 and aH2 handle 8-bit data, so that a maximum data width to be handled by the operation unit is 116 bits. The operation circuits aL1 and aH2 process operations according to operation control signals fL and fH, respectively. During an 8-bit operation, the operation circuits aL1 and aH2 independently operate, and during a 16-bit operation, they cooperate with each other with the operation circuit aL1 handling lower bits and the operation circuit aH2 handling higher 8 bits. At this time, the carry output of the operation circuit aL1 is connected to the carry input of the operation circuit aH2.

The temporary registers xL3 and yL4 handle each lower 8 bits and are connected to the data buses d1L and d2L, respectively. The temporary registers xH5 and yH6 handle each higher 8 bits and are connected to the data buses d1H and d2H, respectively. In response to the operation control signal fL, the operation circuit aL1 processes an operation on data in the temporary registers xL3 and yL4, and provides a result of the operation. In response to the operation control signal fH, the operation circuit aH2 processes an operation on data in the temporary registers xH5 and yH6, and provides a result of the operation. The registers R1 and R2 are paired into a 16-bit register R12, and the registers R3 and R4 are paired into a 16-bit register R34. The registers R1 to R4 are connected to any one of the data buses d1L, d2L, d1H, and d2H. During a 16-bit operation, the registers R1 and R3 are connected to the data bus d1H or d2H, and the registers R2 and R4 are connected to the data bus d1L or d2L. Data are transferred to the temporary registers xL3, yL4, xH5, and yH6, and an operation result is provided in a later state. The register pairs R12 and R34 are connected to the data inputs of the temporary registers xL3, yL4, xH5, and yH6, as well as to the data outputs of the operation circuits aL1 and aH2 through the 16-bit data buses d1 and d2. The 16-bit data bus d1 is divided into the lower 8-bit bus d1L and the higher 8-bit bus d1H, and the 16-bit data bus d2 is divided into the lower 8-bit bus d2L and the higher 8-bit bus d2H. The data output of the operation circuit aL1 is connected to the data bus d1L or d2L, and the data output of the operation circuit aH2 is connected to the data bus d1H or d2H. The selector 7 selects a carry output CoutL of the operation circuit aL1 or a carry input FCinH according to an operation control signal g, and provides the operation circuit aH2 with a carry input CinH.

Figure 6:
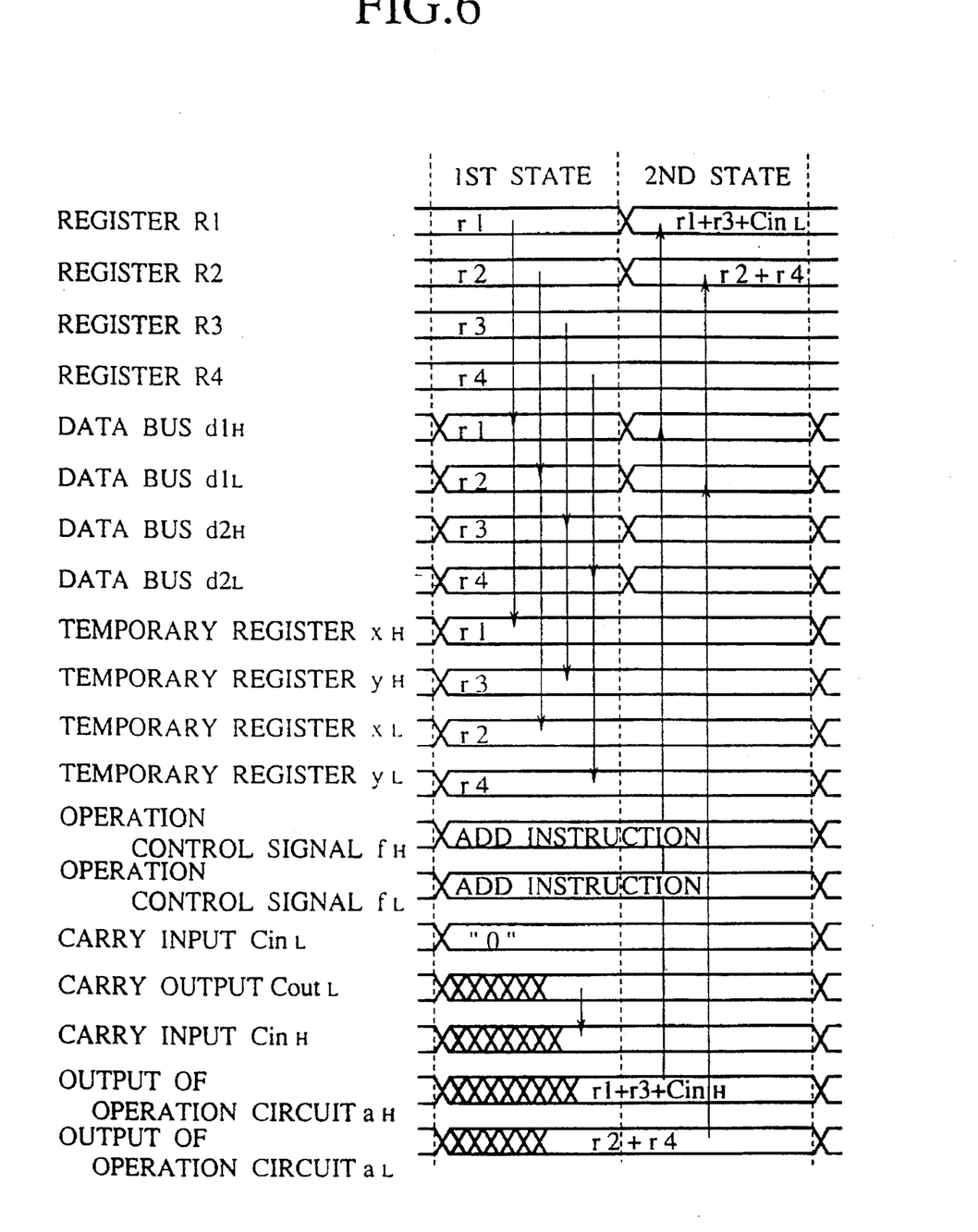
FIGS. 6 to 8 are timing charts showing the operations of the embodiment of the present invention.

A 16-bit operation of the operation unit of the embodiment will be explained with reference to a timing chart shown in FIG. 6. This figure corresponds to FIG. 2 of the prior art. For example, the contents of the register pair R12 are added to the contents of the register pair R34, and a result of the operation is written to the register pair R12. In FIG. 6, "r12" and "r34" indicate the contents of the register pairs R12 and R34, respectively. In the first state, the contents of the register pair R12 are transferred to the data bus d1, and the contents of the register pairs R34 are transferred to the data bus d2. The contents of the register R2 on the data bus d1L are written to the temporary register xL3, the contents of the register R1 on the data bus d1H are written to the temporary register xH5, the contents of the register R4 on the data bus d2L are written to the temporary register yL4, and the contents of the register R3 on the data bus d2H are written to the temporary register yH6. In response to the operation control signals fL and fH, an addition instruction is given to each of the operation circuits aL1 and aH2. In response to the operation control signal g, the carry output CoutL of the operation circuit aL1 is connected to the carry input CinH of the operation circuit aH2. The carry input CinL of the operation circuit aL1 receives "0." The operation circuit aL1 calculates xL+yL and provides the carry output CoutL, and the operation circuit aH2 calculates xH+yH+CinH. In the second state, the operation circuit aL1 provides the data bus d1L with a result of the operation, which is written to the register R2, and the operation circuit aH2 provides the data bus d1H with a result of the operation, which is written to the register R1. In this way, the embodiment of the present invention completes the 16-bit operation shown in FIG. 6 in two states similar to the prior art of FIG. 2, so that there is no difference between the processing speeds of the present invention and the prior art in connection with the 16-bit operation.

Figure 7:
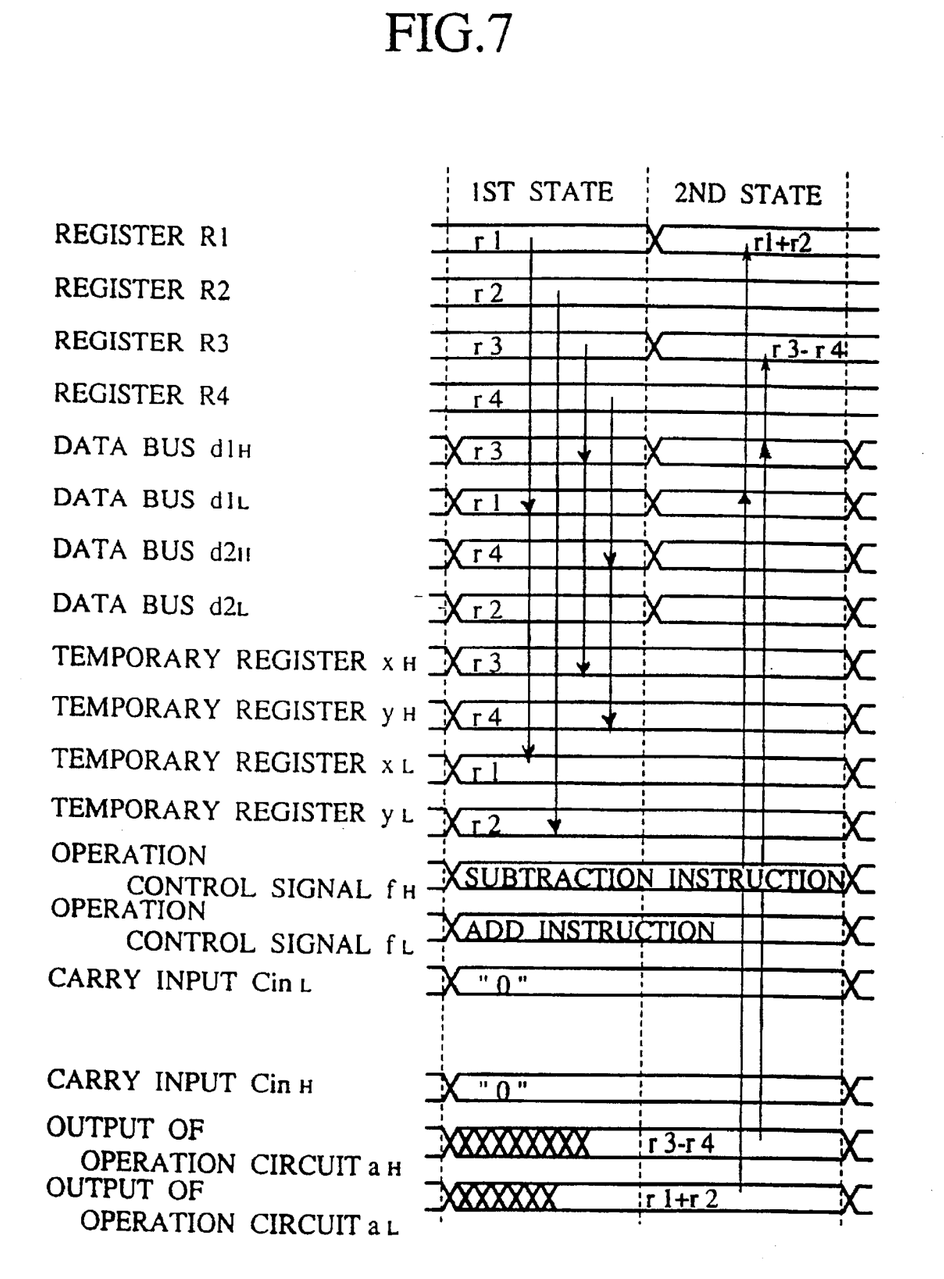

Eight-bit operations of the present invention will be explained with reference to a timing chart shown in FIG. 7. For example, similar to the prior art of FIG. 3, the contents of the register R1 are added to the contents of the register R2, and a result of the operation is written to the registers R1. At the same time, the contents of the register R4 are subtracted from the contents of the register R3, and a result of the operation is written to the register R3. In the first state, the contents of the registers R1 to R4 are transferred to the data buses d1L, d2L, d1H, and d2H, respectively, and are written to the temporary registers xL3, yL4, xH5, and yH6, respectively. In response to the operation control signal fL, an addition instruction is given to the operation circuit aL1, and "0" is given to the carry input CinL of the operation circuit aL1. At the same time, in response to the operation control signal fH, a subtraction instruction is given to the operation circuit aH2. In response to the operation signal g, the carry input FCinH is connected to the carry input CinH of the operation circuit aH2, and "0" is given to the carry input FCinH. Then, the operation circuit aL1 calculates xL+yL, and the operation circuit aH2 calculates xH−yH. In the second state, the operation circuits aL1 and aH2 provide the data buses d1L and d1H with results of the operations, respectively, which are written to the registers R1 and R3, respectively. In this way, the present invention simultaneously carries out the two 8-bit operations in two steps. On the other hand, the prior art of FIG. 1 needs four states to process the same operations, as shown in FIG. 3. This is because the prior art must process 8-bit operations as 16-bit operations, to waste the higher 8 bits of the operation circuit 103. Namely, the prior art must process 8-bit operations one by one. Consequently, the present invention is capable of processing 8-bit operations speedier than the prior art.

Figure 8:
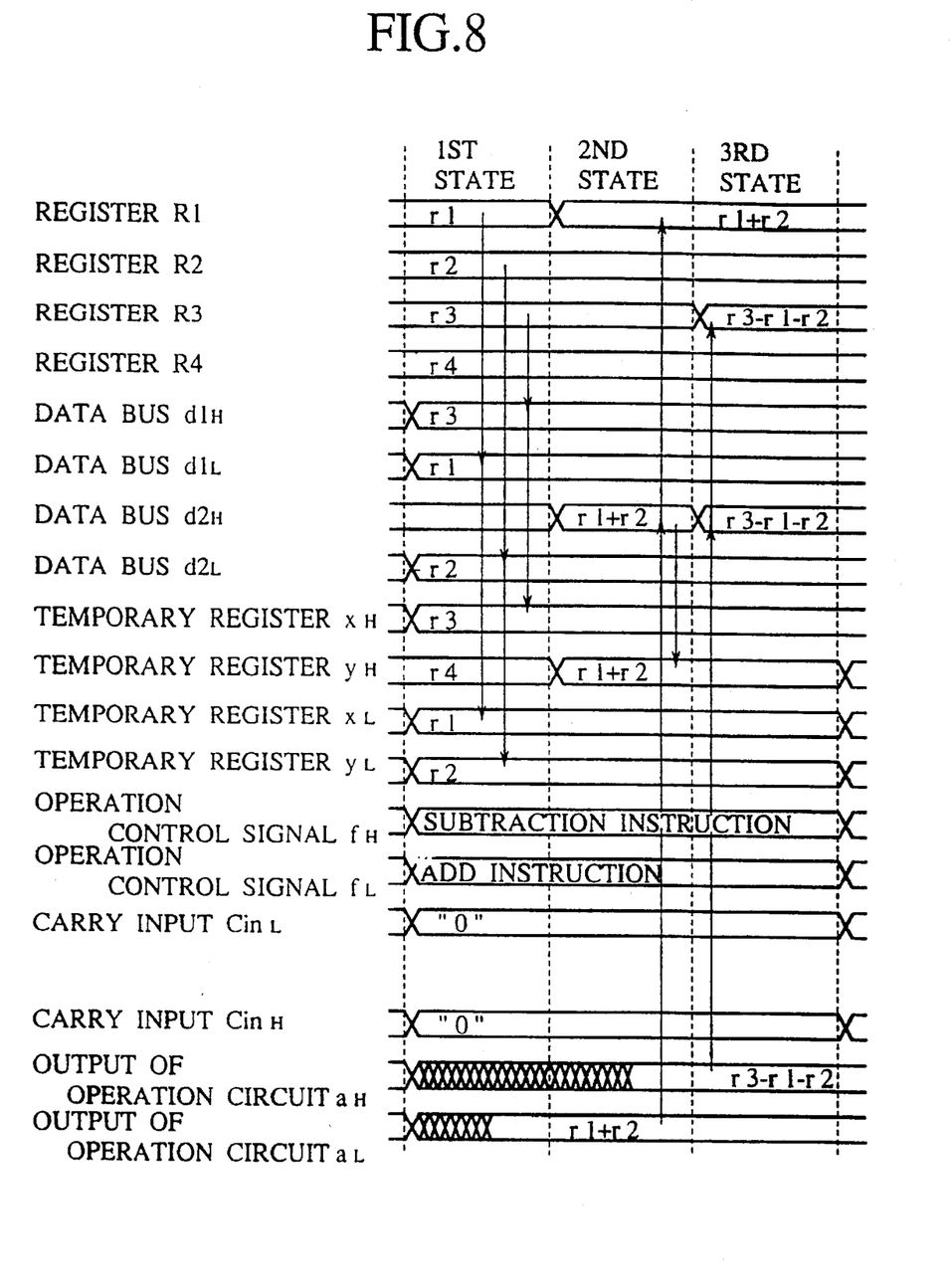

Another operation of the present invention will be explained with reference to a timing chart shown in FIG. 8. This operation corresponds to the operation shown in FIG. 4 of the prior art. Namely, an operation is processed on a result of the preceding operation. In this case, the present invention does not simultaneously process these operations, and therefore, processes the operations in two steps with the first step involving first and second states and the second step involving the second state and the third state. For example, the contents of the register R1 are added to the contents of the R2, and a result of the operation is written to the register R1. Then, the new contents of the register R1 are subtracted from the contents of the register R3, and the difference is written to the register R3. In the first state, the contents of the registers R1 to R3 are transferred to the data buses d1L, d2L, and d1H, respectively, and are written to the temporary registers xL3, yL4, and xH5, respectively. In response to the operation control signal fL, an addition instruction is given to the operation circuit aL1, and "0" is given to the carry input CinL of the operation circuit aL1. Then, the operation circuit aL1 calculates xL+yL. In the second state, the operation circuit aL1 provides the data bus d2L with a result of the operation, i.e., the sum of the contents of the registers R1 and R2. The sum is written to the register R1 as well as to the temporary register yH6. In response to the operation control signal fH, a subtraction instruction is given to the operation circuit aH2. In response to the operation control signal g, the carry input FCinH is connected to the carry input CinH of the operation circuit aH2, and "0" is given to the carry input FCinH. Then, the operation circuit aH2 calculates xH−yH. In the third state, the operation circuit aH2 provides the data bus d2H with the difference between the contents of the register R3 and the new contents of the register R1, which is written to the register R3. Unlike the prior art of FIG. 4 that processes these 8-bit operations one by one in four states, the present invention of FIG. 8 finishes the same operations in three states. This is because the present invention writes, in the first state, part of data that is needed in the next state to the temporary register. It is possible, according to the present invention, to write the partial data, i.e., the contents of the register R3 in the above example to the temporary register in the second state. In addition, the present invention writes a result of an operation to one of the registers as well as to one of the temporary registers. These are the reasons why the present invention is capable of reducing the number of processing states by one compared with the prior art. Namely, the present invention is capable of shortening a processing time by one to two states when continuously processing 8-bit operations. The operation unit according to the present invention, therefore, is appropriate for technical fields that need a high processing speed.

Various modifications will become possible for those skilled in the art after receiving the teachings of the present disclosure without departing from the scope thereof.

What is claimed is:

1. A data operation unit comprising:

plural operation circuits, each said operation circuit having an input receiving data to permit a data processing operation to be performed on said data;

plural sets of data buses, each said set including at least two data buses connected to an associated one of said operation circuits to provide said data to said input and to collect data from an output of said associated one of said a operation circuits;

control lines connected to each of said operation circuits; and data operation control circuitry connected to each of the control lines and operative to provide control signals to establish plural different data processing modes relative to the manner in which said operation circuits receive and process data.

2. The data operation unit of claim 1, wherein the different data processing modes include at least the three following modes:

a first mode in which said data operation control circuitry controls said operation circuits so that data is simultaneously received from at least two of the sets of data buses at the inputs of the associated ones of said operation circuits and processed by said data receiving operation circuits in a mutually exclusive and independent manner;

a second mode in which said data operation control circuitry controls said operation circuits so that data is simultaneously received from at least two of the sets of data buses at the inputs of the associated ones of said operation circuits and processed by said data receiving operation circuits in a mutually cooperative manner; and a third mode in which said data operation control circuitry controls said operation circuits so that data is received from one set of data buses at the input of a first one of the operation circuits to perform a first data processing operation with the results of the first data processing operation being then input to at least a second operation circuit performing a further sequential data processing operation that modifies the results of the first data processing operation.

3. The data operation unit of claim 1, further comprising:

plural first hold elements disposed at the input of each of the plural operation circuits and temporarily holding data applied to each of the inputs;

plural second hold elements connected to the plural sets of data buses and storing data fed to and collected from the sets of data buses; and transfer carry elements that are controlled by the data operation control circuitry to provide a carry associated with results obtained from a data processing operation of one of said operation circuits being forwarded to a second data operation circuit in at least one of the plural different data processing modes.

4. The data operation unit of claim 3, wherein said plural second hold elements are registers.

5. The data operation unit of claim 4, wherein each register has a data capacity of n-bits and said plural registers are divided into groups of registers with each group holding m-bits of data, where n and m are integers greater than 1 and m is a multiple of n.

6. The data operation unit of claim 5, wherein m=2·n and is made up of n higher order bits and n lower order bits.

7. The data operation unit of claim 1, wherein said plural operation circuits are provided as at least one pair with each member of the at least one pair having a n-bit data capacity and executing n-bit operation, n being an integer greater than 1.

8. The data operation unit of claim 7, wherein a first member of the at least one pair is connected to a first set of data buses having a first data bus and a second data bus and a second member of the at least one pair is connected to a second set of data buses having a third data bus and a fourth data bus with each of the first, second, third, and fourth buses having a data capacity of n-bits.

9. The data operation unit of claim 8, further comprising:

a first temporary register connected between the first data bus and the first member;

a second temporary register connected between the second data bus and the first member;

a third temporary register connected between the third bus and the second member; and a fourth temporary register connected between the fourth bus and the second member.

10. The data operation unit of claim 9, further comprising:

a first n-bit register connected to the first data bus;

a second n-bit register connected to the second data bus;

a third n-bit register connected to the third data bus; and a fourth n-bit register connected to the fourth data bus.

11. The data operation unit of claim 10, further comprising:

a transfer carry element controlled by the data operation control circuitry to provide a carry signal associated with results obtained from a first data processing operation of the first member to said second member in at least one of the plural different data processing modes.

12. The data operation unit of claim 11, wherein the at least one of the plural different modes is a mode in which said data operation control circuitry controls said at least one pair so that data is received from the first and second data buses by the first and second temporary registers and provided to said first member which performs said first data processing operation and provides the result of said first data processing operation to the second member so as to perform a second data processing operation following the first data processing operation.

13. The data operation unit of claim 10, wherein the at least one of the plural different modes is one in which said data operation control circuitry causes data stored in said first and second n-bit registers to be provided to said first member to execute a first one of the n-bit operations while data stored in said third and fourth n-bit registers is provided to said second member to simultaneously execute a second one of the n-bit operations and said data operation control circuitry further causes a result of the execution of the first n-bit operation to be stored in a first one of the n-bit registers while a result of the execution of the second n-bit operation is simultaneously stored in a second one of the n-bit registers.

14. The data operation unit of claim 1, wherein the at least one of the plural modes is a mode selected from the group consisting of a first mode in which there are at least a first and a second operation circuit which are controlled by the data operations control circuitry to be operated independently and a second mode in which the at least first and second operation circuits are operated cooperatively by said data operation control circuitry so that the first operation circuit executes an operation using lower order bits while the second operation circuit executes an operation using higher order bits.

15. The data operation unit of claim 14, further comprising a transfer carry element responding to the data operation control circuitry to selectively provide a carry signal from the first operation circuit to the second operation circuit in the second mode.

16. The data operation unit of claim 15, further comprising:

first, second, third and fourth n-bit registers connected to the sets of data buses connected to the first and second data operation circuits said first and second n-bit registers being paired to form a first 2·n-bit register and said third and fourth n-bit registers being paired to form a second 2·n-bit register.

17. The data operation unit of claim 16, wherein the first data operation circuit is connected to first and second data buses and the second data operation circuit is connected to third and fourth data buses.

18. The data operation unit of claim 17, further comprising:
- a first temporary register connected between the first data bus and the first data operation circuit;
- a second temporary register connected between the second data bus and the first data operation circuit;
- a third temporary register connected between the third data bus and the second data operation circuit; and
- a fourth temporary register connected between the fourth data bus and the second data operation circuit.

* * * * *